US007634649B2

(12) United States Patent
Blinick et al.

(10) Patent No.: US 7,634,649 B2
(45) Date of Patent: *Dec. 15, 2009

(54) DEVICE INITIATED MODE SWITCHING

(75) Inventors: Stephen LaRoux Blinick, Tucson, AZ (US); Paul Matthew Richards, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 11/927,447

(22) Filed: Oct. 29, 2007

(65) Prior Publication Data

US 2008/0059786 A1 Mar. 6, 2008

Related U.S. Application Data

(63) Continuation of application No. 10/990,912, filed on Nov. 16, 2004, now Pat. No. 7,366,890.

(51) Int. Cl.

*G06F 9/00* (2006.01)
*G06F 9/24* (2006.01)
*G06F 15/177* (2006.01)

(52) U.S. Cl. ............................... 713/2; 713/1; 713/100; 714/46

(58) Field of Classification Search ..................... 713/1, 713/2, 100, 182; 714/46
See application file for complete search history.

(56) References Cited

U.S. PATENT DOCUMENTS 5,724,527 A * 3/1998 Karnik et al. ............... 710/315
5,774,058 A * 6/1998 Henry et al. ................. 340/5.5
5,875,293 A * 2/1999 Bell et al. ...................... 714/27
5,961,641 A * 10/1999 Hasegawa et al. .............. 713/1
6,209,089 B1 * 3/2001 Selitrennikoff et al. ......... 713/2
6,385,737 B1 * 5/2002 Benignus et al. .............. 714/22
6,442,626 B1 * 8/2002 Smola et al. .................. 710/36
6,647,436 B1 * 11/2003 Jedrzejewski et al. ......... 710/14
6,822,843 B2 * 11/2004 Jitsukawa ................... 361/118
7,366,890 B2 * 4/2008 Blinick et al. .................. 713/2
2002/0083316 A1 * 6/2002 Platenberg et al. ............. 713/2
2004/0151320 A1 * 8/2004 Hitachi et al. ............... 380/277
2004/0153638 A1 * 8/2004 Tseng et al. .................... 713/1
2008/0059818 A1 * 3/2008 Blinick et al. ............... 713/300

OTHER PUBLICATIONS

B.R. Grimes et al., "Initial Machine Load Process for Personal Computer Network Systems", IBM Corp., Technical Disclosure Bulletin, vol. 36, No. 09B, Sep. 1993, pp. 541-542.
Abit BE6 slot 1 440BX ATA66 motherboard, Jul. 23, 1999, pp. 1-4, http://www.active-hardware.com/english/reviews/mainboard/be6.htm.
S. Marwan, "Create Bootable USB Flash Drive", Jan. 14, 2004, pp. 1-2, http://web.archive.org/web/20040114124509/ http://ucsu.colorado.edu/~shaher/Bootable_USB . . . .

* cited by examiner

*Primary Examiner*—Mark Connolly
(74) *Attorney, Agent, or Firm*—William K. Konrad; Konrad Raynes & Victor LLP.

(57) ABSTRACT

Provided are a method, system, deployment and article of manufacture, wherein in one embodiment, a mode of operation may be switched to a service mode by detecting a device inserted into a connector of an input/output port of a system. In the illustrated embodiment, the device has a connector and a wire which loops a code received from the input/output port back to the input/output port. Upon detecting receipt of the transmitted code, the mode of operation may be switched to a service mode. Other embodiments are described and claimed.

16 Claims, 4 Drawing Sheets

DEVICE INITIATED MODE SWITCHING

RELATED APPLICATIONS

This application is a continuation application of application Ser. No. 10/990,912, filed Nov. 16, 2004, entitled "DEVICE INITIATED MODE SWITCHING", assigned to the assignee of the present application, and incorporated by reference in its entirety.

BACKGROUND

1. Field

The present invention relates to a method, system, and an article of manufacture for switching a mode of operation.

2. Description of the Related Art

Computer systems frequently have more than one mode of operation. For example, a computer system may have a normal operational mode for normal operations. In addition, a service mode is often provided to facilitate troubleshooting and other operations. Various input devices have been utilized to switch the mode of operation to a service mode. For example, a computer system may have a key-operated switch which has a "normal operation" position and a "service operation" position. An operator may insert the key into the switch and turn the switch to the "service operation" position to switch the mode of operation of the system from the normal operational mode to a service mode.

Other computer systems have a keyboard with various input keys. In one known computer system, depressing a key at an appropriate time during the boot operation may cause the computer system to interrupt the normal boot mode of operation and switch to a different boot mode which leads to a service operational mode sometimes referred to as a "safe mode" to facilitate troubleshooting.

A computer system may have one or more embedded devices, each of which may itself be a specialized computer system that is part of a larger system such as a host computer system. For example, a storage controller may be embedded in a host computer. The embedded storage controller may be housed on a single microprocessor board with the programs stored in ROM or other types of memory. Some embedded systems include an operating system. Other embedded systems may be so specialized that the entire logic can be implemented as a single program.

An embedded system may itself have, like a host system, multiple operational modes including a service mode. For example, the Enterprise Storage System (ESS), an embedded storage controller marketed by IBM Corporation, has a service mode which may be entered during the boot process. This embedded storage controller has an operating system which is loaded as a user process of the operating system of the host computer. Hence, in this example, the embedded storage controller operating system may be loaded as a part of a startup sequence initiated as the operating system of the host computer system is loaded. The embedded storage controller operating system may have its own startup sequence which, absent operator intervention, loads code which permits normal operation.

However, should the operator wish to direct the embedded storage controller to the storage controller service mode instead of the storage controller normal operation mode, the operator can insert a special program stored on a floppy disk into a floppy disk drive mounted on the embedded storage controller chassis and restart the host computer. As the host computer startup sequence initiates the embedded storage controller startup sequence, the embedded storage controller startup sequence detects the special program on the floppy disk and loads the service mode code instead of the normal operation mode code. The operator may then operate the storage controller in the service mode to perform troubleshooting or other operations appropriate for the service mode.

To switch back to the normal operational mode for the embedded storage controller, the floppy disk containing the special program may be removed from the storage controller floppy disk drive and the host computer may be restarted. As the host computer startup sequence initiates the embedded storage controller startup sequence, the embedded storage controller startup sequence does not detect the special program on a floppy disk and loads the normal operation mode code instead of the service mode code.

SUMMARY OF THE DESCRIBED EMBODIMENTS

Provided are a method, system, deployment and article of manufacture, wherein in one embodiment, a mode of operation may be switched to a service mode by detecting a device inserted into a connector of an input/output port of a system. In the illustrated embodiment, the device has a connector and a wire which loops a code received from the input/output port back to the input/output port. Upon detecting receipt of the transmitted code, the mode of operation may be switched to a service mode. Other embodiments are described and claimed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the present embodiments.

Figure 1:
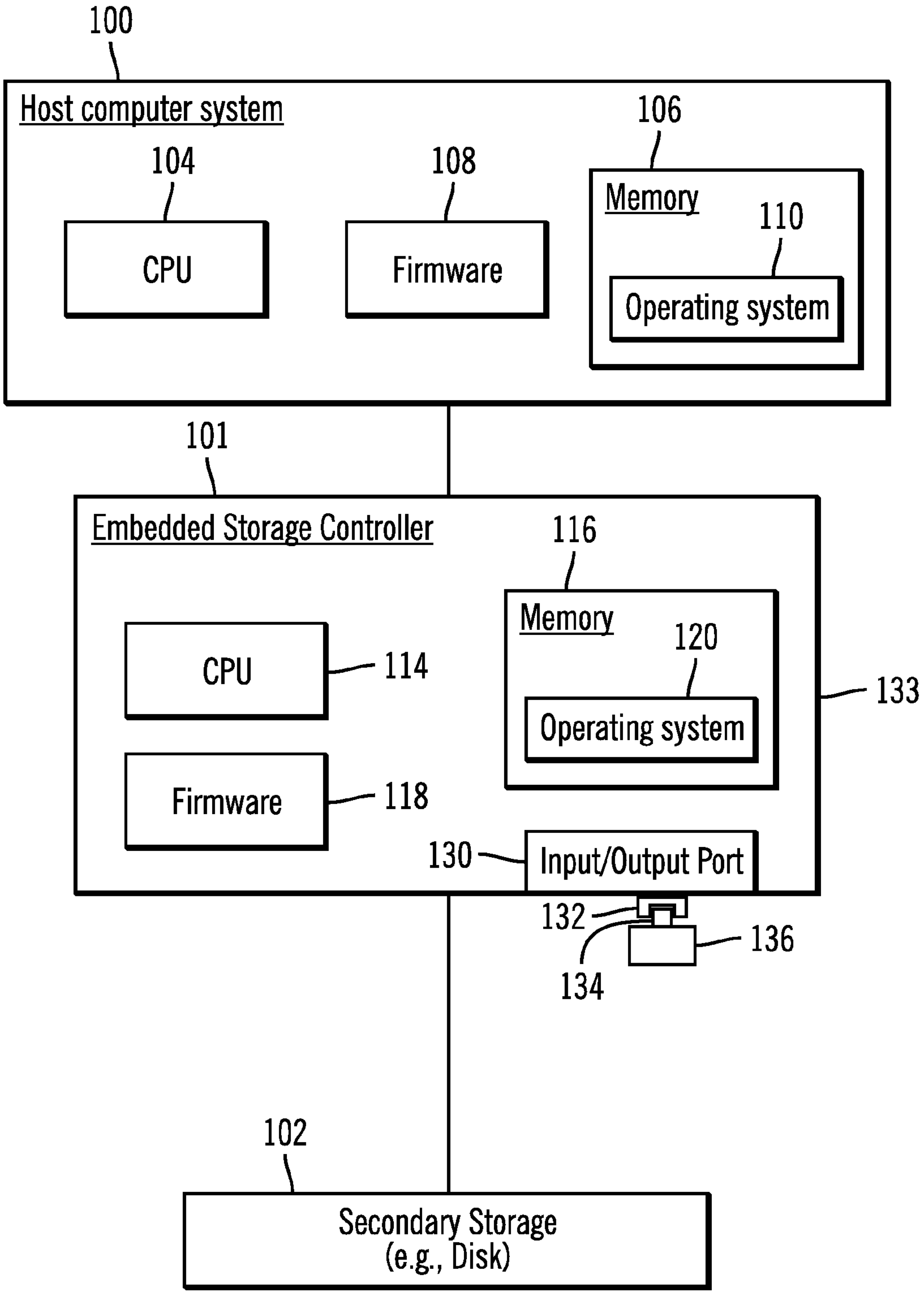
FIG. 1 illustrates a block diagram of a computing environment, in accordance with certain described embodiments.

FIG. 1 illustrates a block diagram of a computing environment, in accordance with certain embodiments of the description provided herein. A computational device which is a host computer system 100 in this embodiment, is shown to have an embedded computer system which, in this embodiment is a storage controller 101 coupled to a secondary storage 102. Although the secondary storage 102 is shown external to the host computer system 100 and the embedded storage controller 101, in certain embodiments the secondary storage 102 may be internal to the host computer system 100 or the storage controller 101. In additional embodiments, additional host computer systems (not shown), such as, a host system that performs Input/Output (I/O) operations with respect to the host computer system 100 may be utilized.

The host computer system 100 may include a personal computer, a workstation, a server, a mainframe, a hand held computer, a palm top computer, a telephony device, a network appliance, a blade computer, a storage controller, etc. Similarly, the embedded computer system 101 may include a personal computer, a workstation, a server, a mainframe, a hand held computer, a palm top computer, a telephony device, a network appliance, a blade computer, a storage controller, etc. The secondary storage 102 may include a direct access storage device, such as, a disk, a tape, a Read/Write DVD, a Read/Write CDROM, a Redundant Array of Independent Disks (RAID), Just a Bunch of Disks (JBOD), etc., or any other storage device. Each of the secondary storage 102, the host computer system 100 and the embedded computer system 101 may be coupled to one or more of the others by a network (not shown), such as the Internet, an intranet, a Local area network (LAN), a Storage area network (SAN), a Wide area network (WAN), a wireless network, etc. Each of the secondary storage 102, the host computer system 100 and the embedded computer system 101 may alternatively be coupled to one or more of the others without a network, such as through direct lines, common bus systems, etc.

The host computer system 100 may include a central processing unit (CPU) 104, a memory 106, a firmware 108, and an operating system 110. Similarly, the embedded computer system 101 may include a CPU 114, a memory 116, a firmware 118, an operating system 120, and an input/output port 130.

Each CPU 104, 114 may comprise a complex instruction set computing (CISC) processor, a reduced instruction set computing (RISC) processor, or any other processor. While only a single CPU 104, 114 is shown for the associated system 100, 101, in certain embodiments the host computer system 100 or the embedded computer system 101 may each include additional CPUs to form a multiprocessing system.

Each memory 106, 116 may comprise a random access memory (RAM). Each memory 106, 116 may also be referred to as physical memory. In certain embodiments, the memory 106, 116 may be included in chips coupled to a bus in the associated computer system 100, 101. Each memory 106, 116 may be volatile, which means that the memory may require a steady flow of electricity to maintain the contents of the memory 106, 116. Alternatively, each memory 106, 116 may be nonvolatile.

Each firmware 108, 118 may include programs or data that may have been written onto read-only memory (ROM), programmable read only memory (PROM), erasable programmable read-only memory (EPROM), etc. Each firmware 108, 118 may be a combination of hardware and software.

Each operating system 110, 120 may be software that controls the execution of system and application programs that execute in the associated computer system 100, 101. Each operating system 110, 120 may provide various services to the system and application programs that execute in the associated computer system 100, 101. In certain embodiments, each operating system 110, 120 may include the LINUX operating system, the UNIX operating system, the AIX operating system, or some other operating system.

As previously mentioned, in the illustrated embodiment, the embedded computer system 101 is an embedded storage controller. It is appreciated that the embedded computer system 101 may be other types of devices as set forth above. In this example, the storage controller 101 has a serial input/output port 130 coupled by an internal bus to the CPU 114. Data may be input and output through the serial input/output port 130 in accordance with a modem protocol such as the RS/232 serial data protocol, for example. It is appreciated that the input/output port 130 may be other types of input/output ports including parallel data ports, network ports, telephony ports, etc. and may operate in accordance with other data transmission protocols including universal serial bus protocols, firewire protocols, printer bus protocols, ISO 7816 Smart Card protocol, etc.

The input/output port 130 has an external connector 132 mounted to the mainboard 133 of the storage controller 101. In the illustrated embodiment, the external connector 132 is a female connector 132 constructed in accordance with the RJ11 socket protocol or standard. It is appreciated that the input/output port 130 may utilize other types of connectors including male connectors, and may be constructed in accordance with other types of connector protocols or standards including RJ45 and an Ethernet protocol.

The female connector 132 is adapted to receive an external male connector 134 of a device 136. As explained below, the device 136 when connected to the connector 132 of the input/output port 130 of the embedded storage controller 101, may be detected by the storage controller 101. In response, the operational mode of the storage controller 101 may be switched from one mode such as a normal operational mode, to a different operational mode, such as a service mode.

Figure 3:
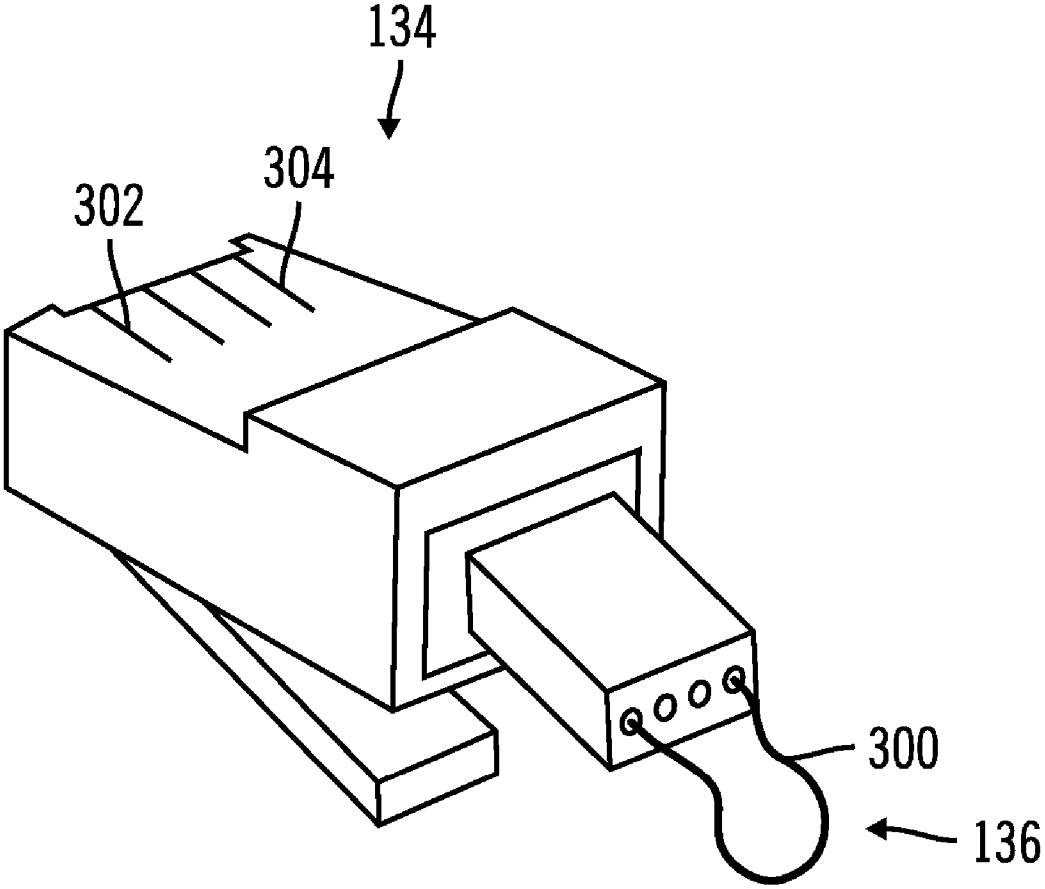
FIG. 3 illustrates one embodiment of a device and connector suitable for mode switching.

In the illustrated embodiment, the external connector 134 is a male connector constructed in accordance with the RJ11 connector protocol or standard as shown in FIG. 3. It is appreciated that the device 136 may utilize other types of connectors including female connectors, and may be constructed in accordance with other types of connector protocols or standards including RJ45 and an Ethernet protocol.

Figure 2:
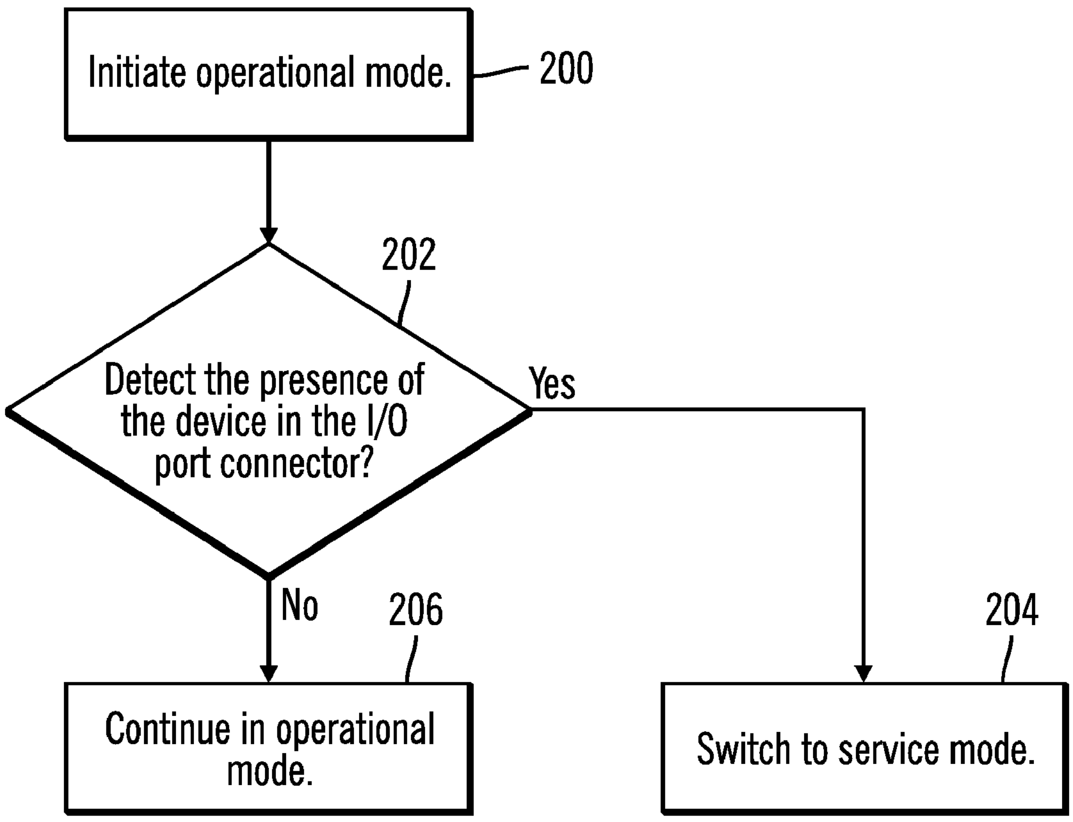
FIG. 2 illustrates logic for switching a mode of operation in response to a device connected to an input/output port, in accordance with certain described embodiments.

FIG. 2 illustrates logic for switching the operational mode of a computer system such as an embedded storage controller 101, in response to insertion of a device such as the device 136 into the connector 134 of an input/output port 130 of the system 101. In the illustrated embodiment, an operational mode is initiated (block 200). In this example, the host computer system 100 performs a startup sequence which includes an initial program load (IPL) or a reinitialized program load (reIPL) of the host computer system 100, where a reIPL is a second or subsequent IPL of the host computer system 100. In certain embodiments, in an IPL or a reIPL the host computer system 100 may undergo a boot sequence. For example, an IPL or a reIPL process may include testing the memory 106 and loading the operating system 110, device drivers, and other applications resident in the host computer system 100.

In the illustrated embodiment, the startup sequence of the host computer system 100 also includes a script, for example, which loads the operating code of the embedded storage controller 101. In this example, the operating code of the embedded storage controller 101 includes its own startup sequence, such as an initial microcode load (IML), for example.

In another operation, a determination is made (block 202) as to whether the presence of a device connected to the input/output port of the embedded controller 101, has been detected. For example, a determination may be made as to whether the device 136 is connected (via the connectors 134, 132) to the input/output port 130 of the controller 101.

In the illustrated embodiment, the startup sequence of the embedded storage controller 101 initiated by the script of the startup sequence of the host computer system 100, can include a test program which probes the serial input/output port 130 to detect the presence of device 136. For example, the storage controller test program can write out a unique string of test data to the transmit (TX) line of the serial input/output port 130. In this example, the device 136 may be configured to return to the receive (RX) line of the serial input/output port 130, the same data string received by the device 136 on the TX line of the serial input/output port 130. Thus, if the embedded storage controller 101 receives back from the device 136 the same string of test data that it transmitted out the serial input/output port 130, the presence of the device 136 in the serial input/output port 130 may be detected.

FIG. 3 shows one embodiment of the device 136 and its connector 134 in greater detail. As shown therein, the device 136 of this example is in the form of a "dongle" and comprises a single loop back wire 300 which is connected at one end to the transmit (TX) terminal 304 of the connector 134, and is connected at its other end to the receive (RX) terminal 302 of the connector 134. In this manner, the loop back wire 300 channels any data string received from the transmit (TX) line of the serial input/output port 130, back to the receive (RX) line of the serial input/output port 130, when the connector 134 of the wire 300 is connected to the connector 132 of the serial input/output port 130. It is appreciated that the particular terminals which are utilized by an input/output port for transmit (TX) or receive (RX) may vary, depending upon the particular application.

If it is determined (block 202) by the test program of the embedded storage controller 101, that the device 136 is connected (via the connectors 134, 132) to the serial input/output port 130 of the controller 101, the embedded storage controller 101 can initiate a switch (204) to a service mode of operation instead of a normal mode of operation. In the illustrated embodiment, the startup sequence of the embedded storage controller 101, can copy operating code to be loaded for a service mode instead of operating code for the normal operational mode. Upon completion of the IPL by the host computer system 100, the IML process begins, observes the service mode code and halts the IML of the normal mode operating code so that service can be performed. In one embodiment, one or more appropriate indicators on the mainboard 133 may be activated to indicate to the service personnel that the embedded storage controller 101 is operating in the service mode.

If it is determined (block 202) by the test program of the embedded storage controller 101, that the device 136 is not connected (via the connectors 134, 132) to the serial input/output port 130 of the controller 101, that is, if it is determined that the string of test data sent to the transmit (TX) line of the serial input/output port 130 was not received back at the receive (RX) line of the serial input/output port 130, the embedded storage controller 101 can continue (block 206) to the normal mode of operation. In the illustrated embodiment, the startup sequence of the embedded storage controller 101, can copy operating code to be loaded for the normal operational mode. Upon completion of the IPL by the host computer system 100, the IML process begins, loading the normal operating code for the normal mode of operation.

In the illustrated embodiment, the device 136 is a single wire. It is appreciated that the device 136 may include a plurality of wires. Moreover, the device 136 may be any of a variety of devices suitable to transmit and receive codes in which the transmit and receive codes may be the same or different. Examples of suitable devices include dongles, laptop computers, personal digital assistants (PDA), logic circuits, etc.

Additional Implementation Details

The described techniques may be implemented as a method, apparatus, deployment or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which embodiments are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the embodiments, and that the article of manufacture may comprise any information bearing medium known in the art.

Certain embodiments may be directed to a method for deploying computing instruction by a person or automated processing integrating computer-readable code into a computing system, wherein the code in combination with the computing system is enabled to perform the operations of the described embodiments.

Figure 4:
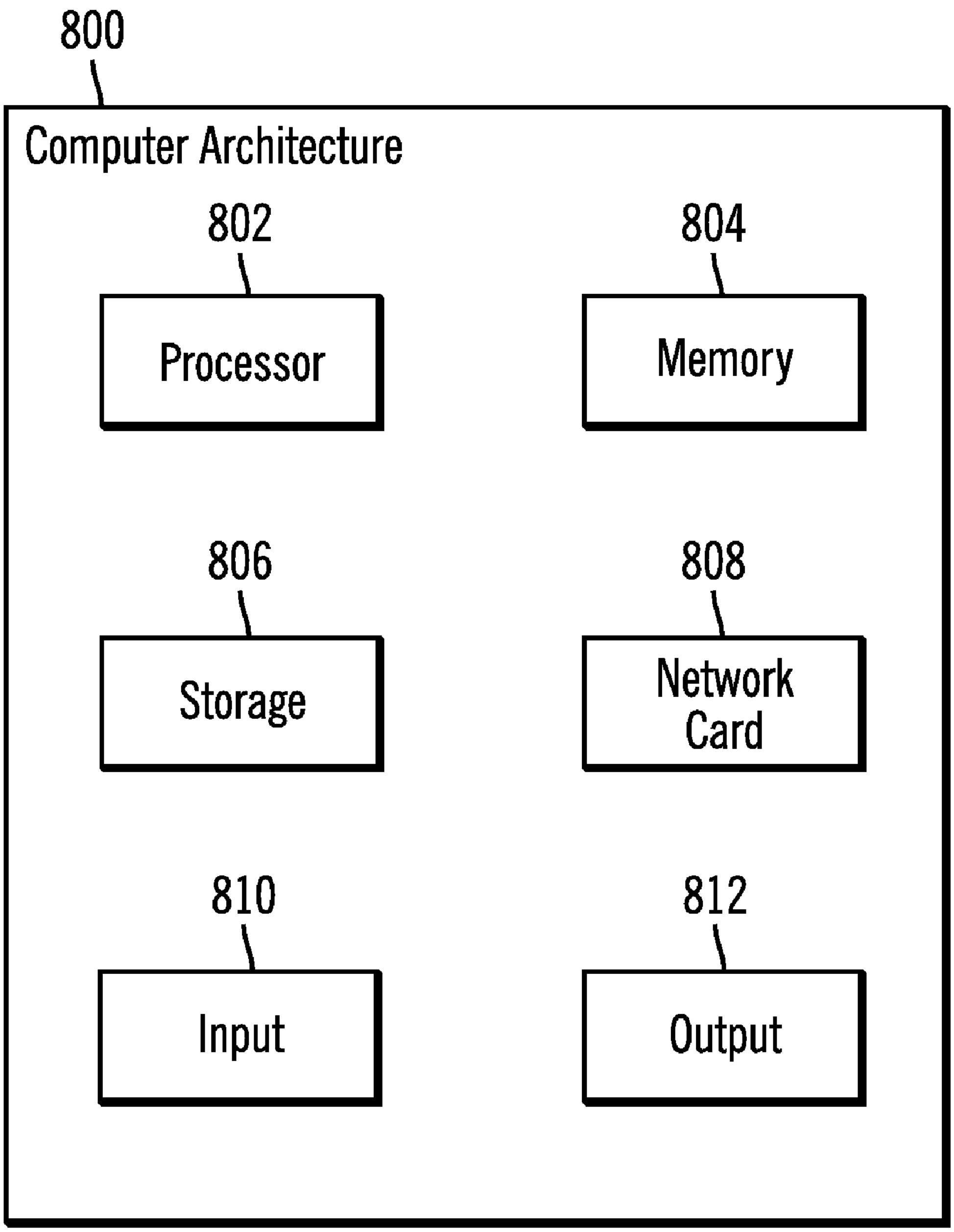
FIG. 4 illustrates a block diagram of a computer architecture in which certain described aspects may be implemented.

In the illustrated embodiment, the computer system 101 has been described as an embedded storage controller. The storage controller 101 may lack user operable input or output devices other than the connector 132 of the serial input/output port 130. It is appreciated that the system 101 may be other types of computer systems. FIG. 4 illustrates a block diagram of a computer architecture in which certain aspects of the description provided herein may be implemented. The computer system 101 may implement a computer architecture 800 having a processor 802 (e.g., CPU 104), a memory 804 (e.g., a volatile memory device, such as, memory 106), and storage 806 (e.g., a non-volatile storage, magnetic disk drives, optical disk drives, tape drives, etc.). In certain embodiments the storage 806 may include the secondary storage 102. The storage 806 may comprise an internal storage device, an attached storage device or a network accessible storage device. Programs in the storage 806 may be loaded into the memory 804 and executed by the processor 802 in a manner known in the art. The architecture may further include a network card 808 to enable communication with a network. The architecture may also include at least one input port 810 for various devices such as a dongle, keyboard, a touchscreen, a pen, voice-activated input, etc. The architecture may include at least one output 812, such as a display device, an indicator, a speaker, a printer, etc.

The logic of FIG. 2 describes specific operations occurring in a particular order. Further, the operations may be performed in parallel as well as sequentially. In alternative embodiments, certain of the logic operations may be performed in a different order, modified or removed and still implement embodiments of the present invention. Moreover, steps may be added to the above described logic and still conform to the embodiments. Yet further steps may be performed by a single process or distributed processes.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the embodiments has been presented for the purposes of illustration and description. It is not intended to be exhaustive or to limit to the precise form disclosed. Many modifications and variations are possible in light of the above teaching.

*AIX, Enterprise Storage Server (ESS) are trademarks of International Business Machines Corp.

*UNIX is a trademark of the Open Group.

What is claimed is:

1. A system, comprising an operating system;

a host processor having a memory adapted to maintain said operating system;

an embedded controller having a first operational mode of operation and a service mode of operation, and an input/output port having a socket; and a device having a male connector adapted to be inserted into said socket;

wherein said controller is adapted to:

detect the presence of said device male connector inserted into said socket of said input/output port of said embedded controller; and switch the mode of operation of said embedded controller from said first operational mode to said service mode in response to said device detection wherein said input/output port is a serial port and wherein said male connector and said socket are each RJ11 standard connectors.

2. The system of claim 1 wherein said socket has a transmit terminal and a receive terminal and wherein said device is adapted to rout signals received by the device from said transmit terminal of said socket back to said receive terminal of said socket.

3. The system of claim 2 wherein said device has a wire shorting said receive terminal to said transmit terminal when said device male connector is inserted into said socket, said wire being adapted to route signals from said transmit terminal to said receive terminal.

4. A system, comprising an operating system;

a host processor having a memory adapted to maintain said operating system;

an embedded controller having a first operational mode of operation and a service mode of operation, and an input/output port having a socket; and a device having a male connector adapted to be inserted into said socket;

wherein said controller is adapted to:

detect the presence of said device male connector inserted into said socket of said input/output port of said embedded controller; and switch the mode of operation of said embedded controller from said first operational mode to said service mode in response to said device detection wherein said embedded controller detecting includes transmitting a code to said input/output port, said device receiving said code and returning said code back to said input/output port, and said embedded controller detecting receipt of said transmitted code.

5. The system of claim 4 wherein said first operational mode includes a first booting process and said service mode includes a second booting process and wherein said switching includes switching said first booting process to said second booting process in response to said device detection.

6. The system of claim 4 wherein said embedded controller includes a mainboard and wherein said socket is positioned on said mainboard of said embedded controller.

7. The system of claim 4 wherein said socket has a transmit terminal and a receive terminal and wherein said device is a dongle comprising said male connector and a wire adapted to short said receive terminal of said socket to said transmit terminal of said socket when said male connector is inserted into said socket.

8. An article of manufacture comprising:

at least one of a hardware device and a computer readable storage medium having code enabled to be executed by a system to perform operations, wherein the system has a host processor having a memory adapted to maintain an operating system, an embedded controller having a first operational mode of operation and a service mode of operation, and an input/output port having a socket, and a device having a male connector adapted to be inserted into said socket, and wherein the operations comprise:

detecting the presence of said device male connector inserted into said socket of said input/output port of said embedded controller; and switching the mode of operation of said embedded controller from said first operational mode to said service mode in response to said device detection wherein said input/output port is a serial port and wherein said male connector and said socket are each RJ11 standard connectors.

9. The article of claim 8 wherein said socket has a transmit terminal and a receive terminal and wherein said device is adapted to rout signals received by the device from said transmit terminal of said socket back to said receive terminal of said socket.

10. The article of claim 9 wherein said device has a wire shorting said receive terminal to said transmit terminal when said device male connector is inserted into said socket, said wire being adapted to route signals from said transmit terminal to said receive terminal.

11. An article of manufacture comprising:

at least one of a hardware device and a computer readable storage medium having code enabled to be executed by a system to perform operations, wherein the system has a host processor having a memory adapted to maintain an operating system, an embedded controller having a first operational mode of operation and a service mode of operation, and an input/output port having a socket, and a device having a male connector adapted to be inserted into said socket, and wherein the operations comprise:

detecting the presence of said device male connector inserted into said socket of said input/output port of said embedded controller; and switching the mode of operation of said embedded controller from said first operational mode to said service mode in response to said device detection wherein said embedded controller detecting includes transmitting a code to said input/output port, said device receiving said code and returning said code back to said input/output port, and said embedded controller detecting receipt of said transmitted code.

12. The article of claim 11 wherein said first operational mode includes a first booting process and said service mode includes a second booting process and wherein said switching includes switching said first booting process to said second booting process in response to said device detection.

13. The article of claim 11 wherein said embedded controller includes a mainboard and wherein said socket is positioned on said mainboard of said embedded controller.

14. The article of claim 11 wherein said socket has a transmit terminal and a receive terminal and wherein said device is a dongle comprising said male connector and a wire adapted to short said receive terminal of said socket to said transmit terminal of said socket when said male connector is inserted into said socket.

15. A device for use with the socket of an input/output port of an embedded controller having a first operational mode of operation and a service mode of operation, wherein said socket has a transmit terminal and a receive terminal, the device comprising:

a male connector adapted to be inserted into said socket; and a circuit adapted to rout signals received by the device from said transmit terminal of said socket back to said receive terminal of said socket wherein said input/output port is a serial port and wherein said male connector and said socket are each RJ11 standard connectors.

16. The device of claim 15 wherein said circuit includes a wire shorting said receive terminal to said transmit terminal when said device male connector is inserted into said socket, said wire being adapted to route signals from said transmit terminal to said receive terminal.

* * * * *